(12) United States Patent
Griffith

(10) Patent No.: US 6,299,378 B1
(45) Date of Patent: *Oct. 9, 2001

(54) CONNECTOR PLATE AND METHOD OF ASSEMBLY

(75) Inventor: John Edwin Griffith, Castle Hill (AU)

(73) Assignee: Co-Ordinated Constructions Pty. Ltd., St. Marys (AU)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,162
(22) PCT Filed: Aug. 22, 1997
(86) PCT No.: PCT/AU97/00541
 § 371 Date: Apr. 26, 1999
 § 102(e) Date: Apr. 26, 1999
(87) PCT Pub. No.: WO98/09029
 PCT Pub. Date: Mar. 5, 1998

(30) Foreign Application Priority Data

Aug. 28, 1996 (AU) .................................................. PO 1934

(51) Int. Cl.⁷ ...................................................... E04C 3/02
(52) U.S. Cl. .......................... 403/293; 411/457; 411/467; 52/92.1; 52/DIG. 6
(58) Field of Search ................................. 411/457, 461, 411/466, 467, 468, 470, 475; 403/293, 294, 283, 13, 14; 52/92.1, 92.2, 92.3, 93.1, 93.2, 257, DIG. 6

(56) References Cited

U.S. PATENT DOCUMENTS

| D. 202,925 | * | 11/1965 | Mort | 411/457 X |
| 705,626 | * | 7/1902 | Vogel | 411/467 X |
| 3,298,151 | * | 1/1967 | Jureit | 52/DIG. 6 X |
| 3,304,106 | | 2/1967 | McCormack | 287/20.92 |
| 3,390,627 | | 7/1968 | Levkovitz | 100/41 |
| 3,530,790 | | 9/1970 | Post | 100/100 |
| 3,599,562 | | 8/1971 | Hutchens, Sr. | 100/100 |
| 3,741,068 | * | 6/1973 | Andruskiewicz | 411/461 |
| 3,771,439 | | 11/1973 | Mort | 100/100 |
| 3,841,195 | | 10/1974 | Jureit | 85/13 |
| 3,892,160 | * | 7/1975 | Jureit et al. | 411/468 |
| 3,910,153 | * | 10/1975 | Jureit | 52/DIG. 6 X |
| 4,031,803 | | 6/1977 | Jureit et al. | 85/13 |
| 4,165,672 | | 8/1979 | Jureit et al. | 85/13 |
| 4,490,956 | * | 1/1985 | Palacio et al. | 52/DIG. 6 X |
| 4,570,407 | * | 2/1986 | Palacio et al. | 52/DIG. 6 X |
| 4,586,550 | * | 5/1986 | Kitipornchai | 52/DIG. 6 X |
| 4,738,071 | | 4/1988 | Ezard | 52/741 |

FOREIGN PATENT DOCUMENTS

| 291878 | | 1/1986 | (AU) . | |
| 2292079 | | 6/1976 | (FR) . | |
| 1281801 | * | 7/1972 | (GB) | 411/466 |
| 1488418 | | 10/1977 | (GB) . | |
| 143067 | | 4/1967 | (NZ) . | |
| 147463 | | 5/1969 | (NZ) . | |
| 9218719 | | 10/1992 | (WO) . | |

* cited by examiner

Primary Examiner—Lynne H. Browne
Assistant Examiner—David E. Bochna
(74) Attorney, Agent, or Firm—Edwin D. Schindler

(57) ABSTRACT

To facilitate pre-plating of nail plated truss joints, a nail plate (10) has teeth (13) of increased length in a region of the plate for fixing plate to one member of a joint prior to assembly of the joint.

10 Claims, 3 Drawing Sheets

CONNECTOR PLATE AND METHOD OF ASSEMBLY

FIELD OF THE INVENTION

This invention relates to the manufacture of wooden structures such as roof and floor trusses, where structural members such as webs and chords are attached by means of metal connector plates, consisting of plates from which have been struck a pattern of projecting teeth which are driven into the members to effect the joint. The invention also relates to connector plates for use in the manufacture of such members. The invention is particularly applicable to the location and attachment of webs to chords in the manufacture of wooden roof trusses.

BACKGROUND ART

Various procedures are used in the assembly and fixing of trusses. In one approach. the chords are laid out and connected, then the webs are positioned and stapled to the chords to maintain their position while connector plates are applied successively to each side of each joint. The plates are driven home by pressing. The need for a stapling operation at each joint adds to the assembly time, as does the positioning of the underneath plate, for example by the use of a jig or frame device, or by temporarily locating the underneath plate by means of a harnmer. The latter technique has the further disadvantage that teeth may be bent, reducing the quality of the joint.

Attempts have been made to reduce the time involved in truss manufacture by attaching the connector plates to components of the truss prior to their assembly with the other components. For example, International patent application No. PCT/FI91/00104 describes an approach in which the plates for one side of the truss are pre-attached to the webs, while the plates for the other side of the truss are pre-attached to the chords. Such a method is of limited usefulness.

SUMMARY OF THE INVENTION

The present invention seeks to provide an alternative approach, which enables the plates for both sides of the joint to be pre-attached to each end of a web, while still enabling the webs to be brought into position in the truss without difficulty, prior to pressing of the joint.

This is achieved by providing the nail plates with at least one, but preferably several, teeth of greater length than the remainder of the plate teeth, these longer teeth being located only in the region of the plate which is to be attached to one of the joint members, preferably the web.

In this way, plates can be attached to the-web ends by pressing the plates into position, the press driving only the longer teeth into the web. The opposed ends of the teeth of the portion of each plate which extends beyond the end of the web will thus still be separated by at least the thickness of the chord to which the web is to be attached, so the web can be brought into position for fixing to the chord without these teeth fouling the chord and thereby obstructing movement of the web.

Of course, while it is preferred to pre-attach the plates to the webs, they may instead be pre-attached in the same way to the chords at the correct joint positions and the webs then brought into position with their ends between the projecting opposed pre-fixed fixed plates.

It may be noted here that in U.S. Pat. No. 3,304,106 of Gerald M. McCormack there is described a nail plate which is divided into a region having short teeth and a region having longer teeth. In the McCormack patent, however, the short teeth have low withdrawal strength, so that the plate may be permanently fastened to the member by means of the longer teeth and removably fastened to the other member by the short teeth, in order that the truss may be disassembled for transport and later reassembled on site. Because the short teeth are incapable of forming a permanent joint, nail holes are also provided and the final joint is achieved by nailing through these holes.

A connector plate of the kind described by McCormack is distinguished from plates according to the present invention by the fact that the short teeth of McCormack are designed for low withdrawal resistance and are incapable of forming a permanent joint, whereas in the case of the present invention the short teeth are of conventional connector plate design, and consequently have conventional withdrawal resistance and are capable of forming a permanent joint. In other words, McCormack achieves the ability to disassemble the joint by having shorter than normal teeth over one half of the plate, whereas in the present invention the ability to pre-attach plates to one side of the joint is achieved by using in one half of the plate some teeth which are longer than normal. The conventional teeth employed in the plate are, ipso facto, capable of forming a satisfactory joint without additional means such as nailing. Such a joint will be referred to herein as a permanent joint.

The invention will be exemplified below in its application to roof trusses, but it is to be understood that it is applicable to other structural assemblies of wooden components, such as floor trusses.

The accompanying drawings illustrate, by way of example only, the application of the invention to the manufacture of roof trusses.

DESCRIPTION OF THE PREFERRED EMBODIMENTS

Figure 1:
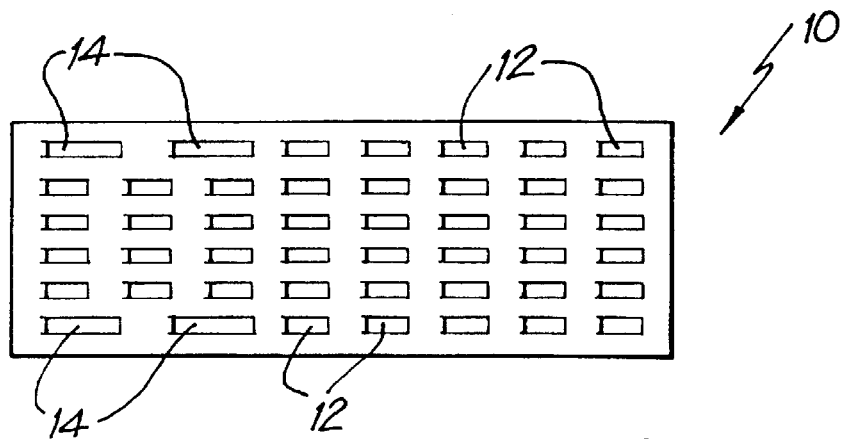
FIG. 1 is a plan view of a connector plate according to a first embodiment of the present invention.
Figure 2:
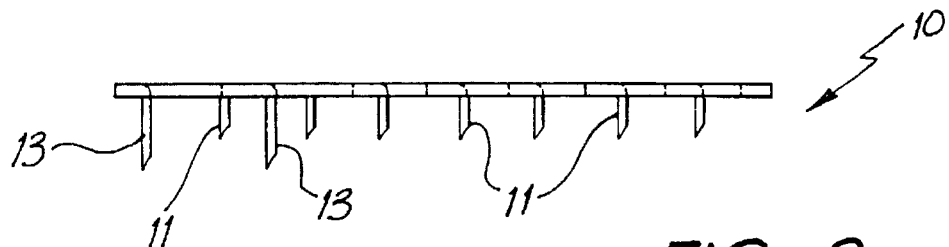
FIG. 2 is a side elevation of the connector plate of FIG. 1.

As shown in FIGS. 1 and 2, the connector plate 10 is provided, in a conventional manner, with rows of teeth 11 struck out from the plate leaving apertures 12.

The manner of formation and the pattern of these teeth may be of any suitable kind.

Figure 3:
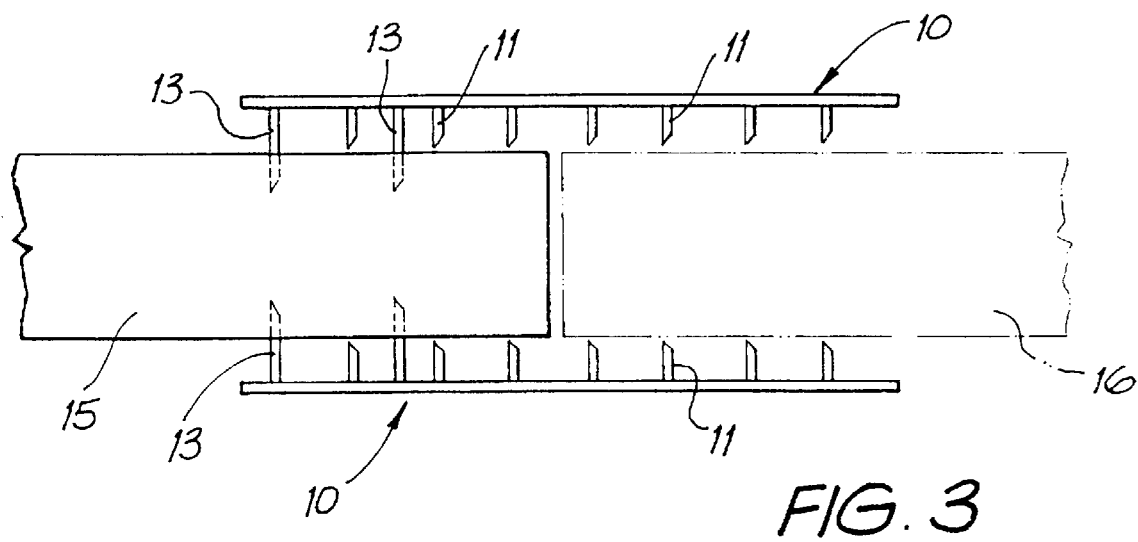
FIG. 3 illustrates a connector plate pre-fixed to a web.

At four locations on the left hand portion of the plate (as viewed in FIGS. 1 and 2), a longer tooth 13 is formed by punching from a longer aperture 14. In this way, as illustrated in FIG. 3, a pair of the plates 10 may be attached to an end of a web 15 by driving the longer teeth 13 into the web, but stopping short of the point where the shorter, conventional teeth 11 penetrate the web.

The web can then be introduced with a rotational movement into a truss so that the opposed free ends of the pre-attached plates embrace the chord 16, shown in ghost outline in FIG. 3, and the joint subsequently formed by pressing the plates in any conventional manner.

The plate 10 illustrated in FIGS. 1 and 2 is provided with four long teeth 13, one approximately at each corner of the region of the plate to be engaged with the web. This is but one example of a suitable pattern of location of the longer teeth. They may, for example, all be located at the rear of the plate, or towards the middle, or along one or both sides. The location of the longer teeth is entirely a matter of choice. Similarly, the number of longer teeth may be chosen to suit the convenience of the application to which the plate is to be put, and to enable efficient production of the plates. While it is possible to use only one longer tooth, a greater number is preferred to give stability to the pre-fixing of the plate. It is also preferred in the interests of stability that longer teeth are located both at the rear and the forward parts of the relevant region of the plate.

Connector plates according to the invention can be employed at joints between more than two members, for example where two or three webs are connected to a chord at the same location.

Figure 4:
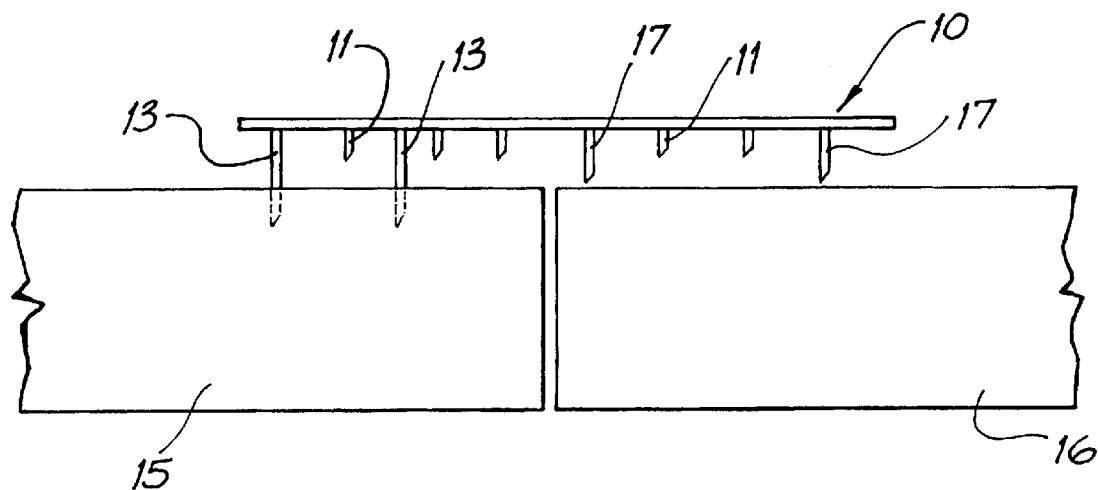
FIG. 4 illustrates a connector plate according to a second embodiment of the invention prefixed to a first member.
Figure 5:
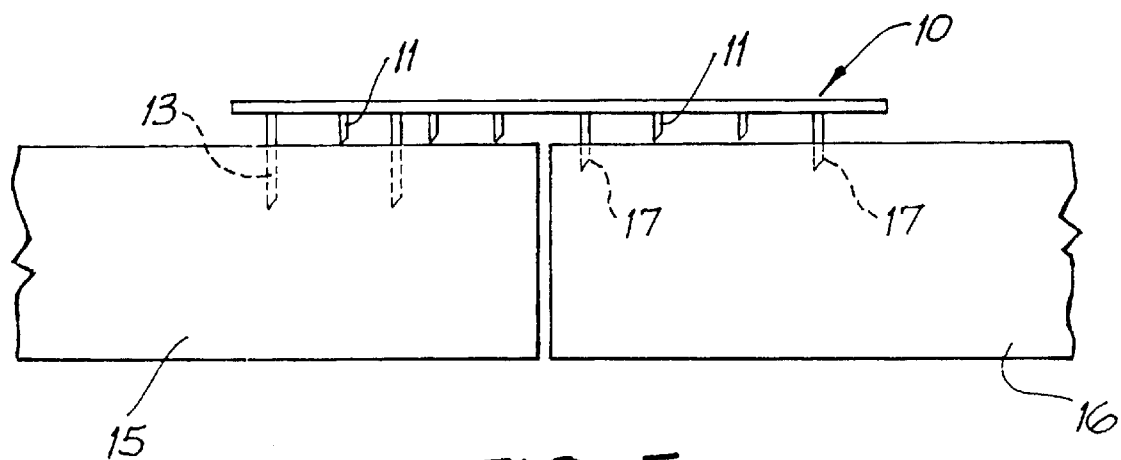
FIG. 5 illustrates the connector plate of FIG. 4 in a first stage of temporary fixing to a second member.

FIGS. 4 and 5 illustrate a further development of the invention, in which the second portion of the plate is provided with a number of teeth the length of which is intermediate that of the longer teeth provided for the pre-fixing of the first portion of the plate, and that of the conventional teeth 11.

This plate enables the elimination of separate means, such as stapling, for the temporary fixing of the web 15 in its correct position in conjunction with the chord 16, prior to the pressing of the joint. The plates 10 (only one of which is shown here) are pre-fixed to the web 15 by pressing them only by a distance which does not exceed the difference between the length of the teeth 13 and the teeth 17. At this stage the teeth 11 will be proud of the surface of the web, and the teeth 17 will not obstruct the engagement of the web with the chord, as the chord enters the space between the opposed free ends of the plates. The plates can then be engaged with the chords by driving the intermediate teeth 17 into the chord, for example by means of a hammer blow, prior to the final pressing of the joint.

Figure 6:
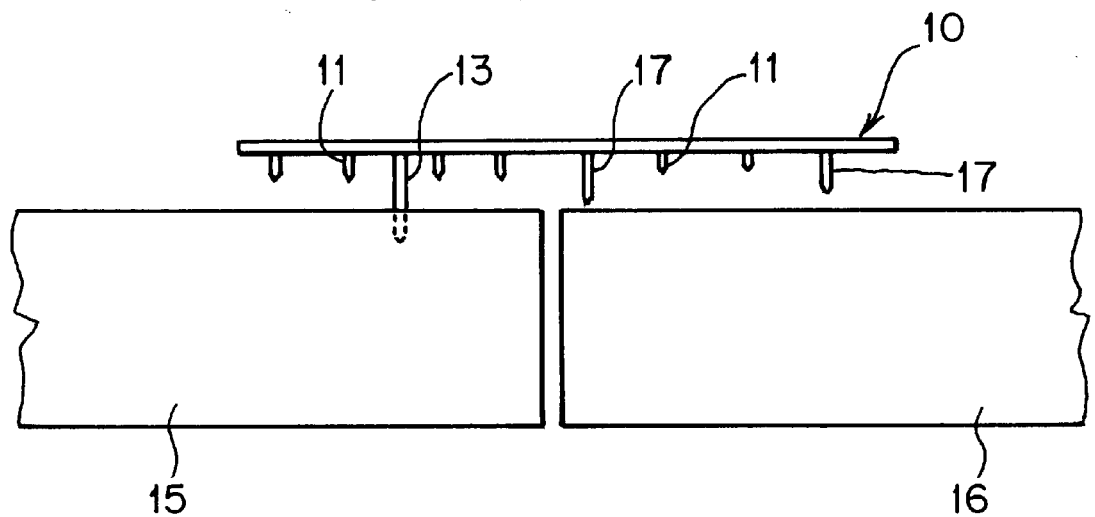
FIG. 6 illustrates a connector plate according to a third embodiment prefixed to a first member.

FIG. 6 illustrates a third, less preferred, embodiment in which the first region of the connector plate has only a single long tooth 13.

Figure 7:
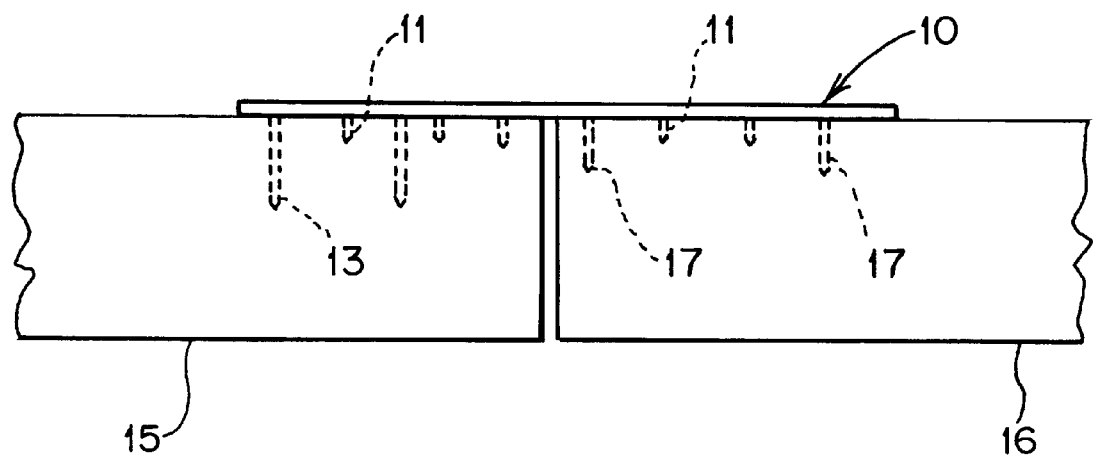
FIG. 7 illustrates the connector plate of FIG. 4 permanently joining the first and second members.

FIG. 7 shows the arrangement after the final pressing operation, whereby the teeth 11, 13, 17 are driven into both the first and second members, so as to effect a permanent joint between the members.

It will be understood that the principles disclosed in this specification can be applied to connector plates and connector plate joints in wooden structures in many ways other than those given by way of example.

What is claimed is:

1. A method of forming a joint between a first wooden member and a second wooden member employing a connector plate, said connector plate comprising a metal plate from which has been struck a pattern of projecting teeth which are driven into respective wooden members to effect a permanent joint between said members, said pattern of teeth including a first region of the plate, being the region of the connector plate which is intended for engagement with one of said members and a second region of the plate, being the region of the connector plate which is intended for engagement with a second of said members, wherein at least one further tooth provided in said first region is longer than the remainder of the teeth in that region and longer than the teeth in said second region, said method comprising the steps of:

(a) attaching said plate to said first member by penetration of the first member with said at least one further tooth to a depth which does not require the penetration of the first member by the remaining teeth in said first region, (b) locating the first and second members in the relative positions in which they are to be joined, and (c) causing the penetration of said first and second members by the remaining teeth of said first region and the teeth of said second region.

2. A method according to claim 1, in which a connector plate is employed on each side of the joint, the first region of each plate being attached to the first member.

3. A method of forming a joint between a first wooden member and a second wooden member employing a connector plate, said connector plate comprising a metal plate from which has been struck a pattern of projecting teeth which are driven into respective wooden members to effect a permanent joint between said members, said pattern of teeth including a first region of the plate, being the region of the connector plate which is intended for engagement with one of said members and a second region of the plate, being the region of the connector plate which is intended for engagement with a second of said members, wherein at least one further tooth provided in said first region is longer than the remainder of the teeth in that region and longer than the teeth in said second region, and in which at least one additional tooth is provided in said second region having a length which is intermediate the length of said further teeth in said first region and the remainder of the teeth in said second region, said method comprising the steps of:

(a) attaching said plate to said first member by the penetration of the first member with said at least one further tooth in said first region to a depth which does not require the penetration of the first member by the remaining teeth in said first region, (b) locating the first and second members in the relative positions in which they are to be joined, (c) attaching said plate to said second member by the penetration of the second member with said at least one additional tooth of intermediate length in said second region to a depth which does not require the penetration of the second member by the remaining teeth in said second region, and (d) causing the penetration of said first and second members by the remaining teeth of said first region and the remaining teeth of said second region.

4. A method according to claim 3, in which a connector plate is employed on each side of the joint, the first region of each plate being attached to the first member.

5. A structure for use in manufacturing wooden structures, such as roofs and floors, said structure comprising:

a first wooden member;

a second wooden member;

a connector plate forming a permanent joint between said first wooden member and said second wooden member, said connector plate comprising a metal plate having a pattern of projecting teeth, which are driven into respective portions of said first wooden member and said second wooden member for effecting said permanent joint between said first wooden member and said second wooden member, said pattern of projecting teeth including a first region of said connector plate being in a region of said connector plate which engages said first wooden member and a second region of said connector plate being in a region of said connector plate which engages said second wooden member such that engagement of said Pattern of protecting teeth with respective said first wooden member and said second wooden member effects said permanent joint; and, at least one further tooth is provided in said first region of said connector plate which is longer than other teeth in said first region and longer than said pattern of projecting teeth in said second region of said connector plate.

6. The structure for use in manufacturing wooden structures according to claim 5, wherein said connector plate includes a plurality of said further teeth.

7. The structure for use in manufacturing wooden structures according to claim 6, wherein a portion of said further teeth are located in a part of said first region of said connector plate which is remote from said second region, and a portion of said further teeth are located in a part of said first region which is adjacent said second region.

8. The structure for use in manufacturing wooden structures according to claim 5, comprising at least two of said connector plates, with at least one of said connector plates being utilized on each side of said permanent joint, said first region of each of said connector plates being attached to said first wooden member.

9. A structure for use in manufacturing wooden structures, such as roofs and floors, said structure comprising:

a first wooden member;

a second wooden member;

a connector plate forming a permanent joint between said first wooden member and said second wooden member, said connector plate comprising a metal plate having a pattern of projecting teeth, which are driven into respective portions of said first wooden member and said second wooden member for effecting said permanent joint between said first wooden member and said second wooden member, said pattern of projecting teeth including a first region of said connector plate being in a region of said connector plate which engages said first wooden member and a second region of said connector plate being in a region of said connector plate which engages said second wooden member;

at least one further tooth is provided in said first region of said connector plate which is longer than other teeth in said first region and longer than said pattern of projecting teeth in said second region of said connector plate; and, at least one additional tooth in said second region of said connector plate, said at least one additional tooth having a length which is intermediate the length of said at least one further tooth in said first region of said connector plate and a remainder of said pattern of projecting teeth in said second region of said connector plate.

10. The structure for use in manufacturing wooden structures according to claim 9, wherein said connector plate includes a plurality of said additional teeth.

* * * * *